United States Patent [19]

Renaud

[11] Patent Number: 4,750,290
[45] Date of Patent: Jun. 14, 1988

[54] DOUBLE HOOK WORM JIG

[76] Inventor: Ronnie C. Renaud, Rte. 1, Liberty, S.C. 29657

[21] Appl. No.: 37,823

[22] Filed: Apr. 13, 1987

[51] Int. Cl.⁴ ............................................. A01K 85/00
[52] U.S. Cl. .................................. 43/42.29; 43/42.11; 43/42.24
[58] Field of Search ................. 43/42.29, 42.24, 42.11, 43/42.13

[56] References Cited

U.S. PATENT DOCUMENTS

| | | | |
|---|---|---|---|
| 825,140 | 7/1906 | Lull | 43/35 |
| 994,927 | 6/1911 | Jefferson | 43/42.36 |
| 2,479,484 | 8/1949 | Fornas | 43/42.11 |
| 3,673,726 | 7/1972 | La Montagne | 43/42.11 |
| 3,805,437 | 4/1974 | Harris | 43/42.13 |
| 4,015,363 | 4/1977 | Sedlak | 43/42.28 |
| 4,201,008 | 5/1980 | Sparkman | 43/42.13 |
| 4,671,007 | 6/1987 | Stanczyk | 43/42.11 |

Primary Examiner—Gene P. Crosby
Attorney, Agent, or Firm—Cort Flint

[57] ABSTRACT

A fishing jig is disclosed comprising a first upstanding fishhook (10) carried generally in a first vertical plane; and a second upstanding fishhook (12) carried generally in a second vertical plane generally parallel to the first vertical plane. A first shank (20) is connected to fishhook (10); and a second shank (26) is connected to second fishhook (12). Yoke (32, 34) connects the shanks (20, 26) which are disposed in a first horizontal plane. A raised eyelet (36) for attachment to a fishing line is connected to the yoke disposed in a second horizontal plane spaced from the first horizontal plane in a manner that said first and second fishhooks are turned upwards regardless of the angle at which said fishing jig enters the water and remain turned upwards while the fishing jig is pulled through the water to prevent snagging.

4 Claims, 2 Drawing Sheets

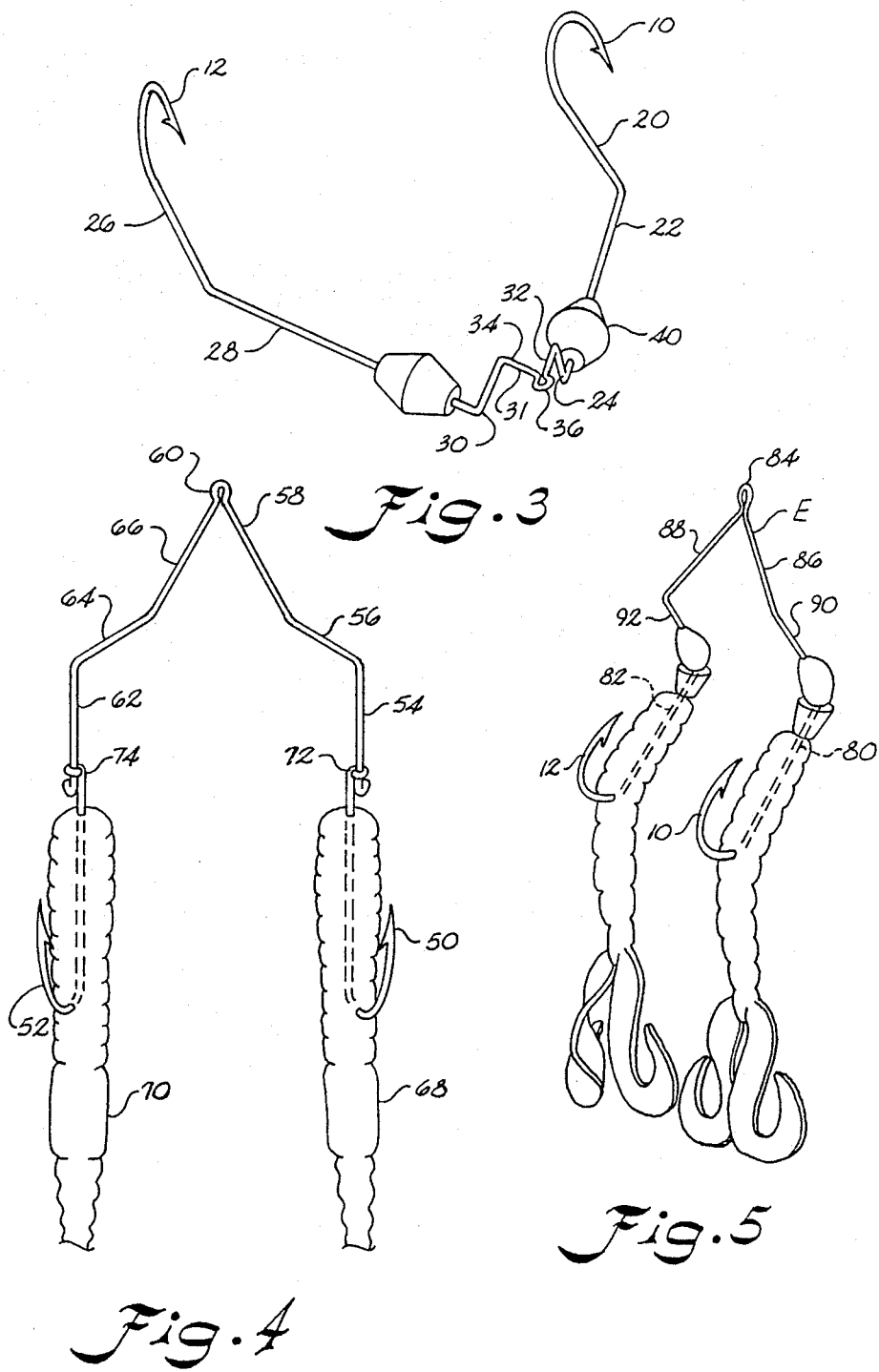

DOUBLE HOOK WORM JIG

BACKGROUND OF THE INVENTION

The invention relates to a fishing jig and particularly to a double hook fishing jig from which two parallel baits may be fished.

Fishing jigs have become popular over the past years. A typical fishing jig comprises a hook with a rubber or soft plastic worm attached to the hook. A lead weight is either affixed to the shank of the hook adjacent the eyelet or a weight is attached to the fishing line ahead of the eyelet. The jig is fished through the water by pulling it up and letting it sink back down, usually by bumping it along the bottom. Making the jig weedless so that it does not snag on any of the bottom structure of the lake is a problem to which much attention has been given. The jig typically consists of a single hook.

U.S. Pat. No. 994,927 discloses an artificial bait having a pair of hooks. U.S. Pat. No. 825,140 likewise discloses a double hook artificial fishing bait. However, neither of these structures is suitable for use as a fishing jig in the manner described above.

Accordingly, an object of the invention is to provide a fishing jig having at least two fishhooks so that a plurality of fishing baits may be used.

Another object of the invention is to provide a fishing jig having a plurality of hooks so that baits of different colors may be fished simultaneously.

Another object of the invention is to provide a fishing jig having a plurality of hooks wherein the jig is constructed so that the hooks turn upward when the jig is thrown into the water, regardless of the angle at which the jig enters the water and maintain the upward turned configuration while being pulled through the water.

SUMMARY OF THE INVENTION

The above objectives are accomplished according to the present invention by providing a pair of spaced fishhooks each having a shank which converges to a yoke which is raised and carries an eyelet for attachment to a fishing line. The fishhooks are rigid and turned upwards. Weights may be attached to the shank portions of the jig which converges to the yoke. Due to the shank and yoke construction, the raised eyelet turns the jig so that the hooks are turned upwards regardless of the angle at which the jig is thrown into the water. As the jig is pulled through the water, the center of gravity is below the raised eyelet causing the jig to be pulled through the water with the hooks turned upwards. As the jig is allowed to bump along the bottom of the lake, the jig is practically snag-proof since the hooks are always turned upwards.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3 is a perspective view of a fishing jig constructed in accordance with the present invention with the bait removed;

FIG. 4 is a elevation illustrating an alternate form of a double bait fishing bait constructed in accordance with the present invention; and FIG. 5 is a perspective view of a modified embodiment of the invention.

DESCRIPTION OF A PREFERRED EMBODIMENT

Figure 1:
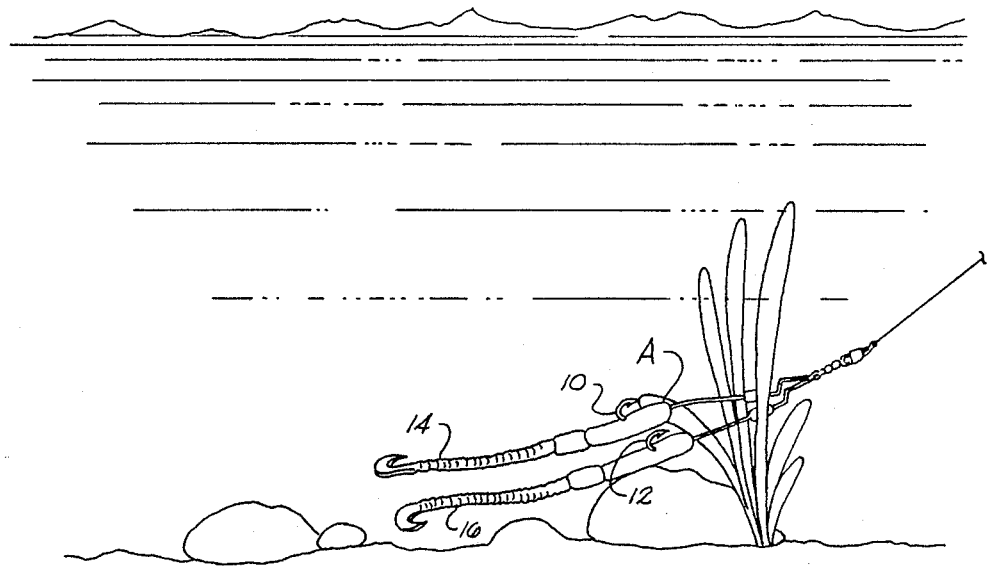
FIG. 1 is a perspective view illustrating a fishing jig constructed in accordance with the invention being pulled through the water with its hooks turned upwards.

Referring now in more detail to the drawings, a fishing jig A is illustrated in FIG. 1 which includes a first hook 10 and a second hook 12. A soft rubber of plastic worm bait 14 is affixed on hook 10 and a worm 16 is affixed to hook 12. The jig is pulled through the water with hooks 10 and 12 turned upwards, as can best be seen in FIG. 1. With the hooks turned upwards, the jig does not get caught on structures on the lake bottom.

Referring now in more detail to the jig, it can be seen that hooks 10 and 12 are connected by a convergent shank means B to a yoke C which converges to an eyelet D for attachment of a fishing line 18. convergent shank means B includes a first shank 20 connected to hook 10 and a first convergent shank 22 integral with shank 20 and terminating at a first upwardly inclined yoke leg 24. Second upstanding hook 12 is carried by a second shank 26 which terminates at a second convergent shank 28 which terminates at a second upwardly inclined yoke leg 30. Upwardly inclined yoke legs 24 and 30 terminate respectively in a convergent yoke which has a first convergent yoke leg 32 and a second convergent yoke leg 34 integral respectively with yoke legs 24 and 34. A fixed eyelet 36 is carried at the end of convergent yoke means 31. Weight means 40 may be carried adjacent yoke means C on first convergent shank 22 and a second weight means 42 may be carried on second convergent shank 28 as can best be seen in FIGS. 2 and 3.

Figure 2:
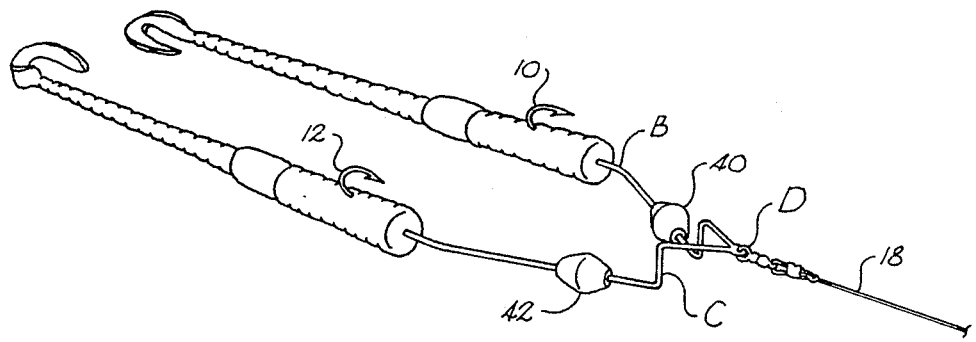
FIG. 2 is a perspective view of a fishing jig constructed in accordance with the present invention having parallel baits.

As can best be seen in FIG. 2, eyelet 36 is raised substantially above the frame of the fishing jig which consists of shank means B and is positioned above shank means B by yoke C. This results in the center of gravity of the fishing jig being below the eyelet and hooks 10 and 12 being turned upwards when being pulled through the water. Regardless of the angle at which the fishing jig is thrown into the water, fishhooks 10 and 12 are immediately turned upwards as pulling of the jig through the water begins. Fishhooks 10 and 12 remained turned upwards, as can best be seen in FIGS. 1 and 2, as the fishing jig is pulled through the water.

Referring now to FIG. 4, an artificial fishing bait is illustrated wherein a first fishhook 50 and a second fishhook 52 are provided. Shank means includes a first shank 54, a first convergent shank 56, and a convergent yoke leg 58 terminating in an eyelet 60. Fishhook 52 is carried on a second shank 62 integral with a second convergent shank 64 which is integral with a second yoke leg 66 terminating in eyelet 60. Artificial fishing worms 68 and 70 are carried by respective fishhooks 50 and 52. It will be noted that a swivel connection 72 is provided between shank 54 and hook 50. A second swivel connection 74 is provided between hook 54 and shank 62. The artificial bait shown in FIG. 4 may be utilized when fishing with live bait or artificial bait in a vertical position. For example, when fishing over the side of the boat with the fishing line hanging straight down and tied to eyelet 60 the fishhooks may be fished as shown in the position of FIG. 4.

The fishing jig may be described in terms of the various planes in which the fishhooks and frame defined by the shanks and yokes lie. First upstanding fishhook 10 lies in a first vertical plane and second fishhook 12 lies generally in a second vertical plane spaced from the first vertical plane. Shank means B lies in a first horizontal plane and convergent yoke means 31 lies in a second horizontal plane which is spaced above the horizontal plane of shank means B as provided by inclined yoke legs C. Eyelet D attached to fishing line 18 is considerably raised above the frame and shank of the fishhooks to turn the fishhooks upwards at all times.

As can best be seen in FIG. 5, the yoke means E for adjoining shanks 80, 82 of hooks 10, 12 may be inclined to the horizontal plane of shanks 80, 82 at an acute angle, preferably of forty-five degrees. Yoke means E includes convergent legs 86, 88 extending at an acute angle from adjoining legs 90, 92, respectively, which connect yoke means E to shanks 80, 82. Eyelet 84 for the fishing line is carried at the convergent legs 86, 88 of the yoke and raised accordingly. This gives the same affect as the raised eyelet 36.

Thus, it can be seen that an advantageous construction can be had for a fishing jig wherein two or more artificial fishing baits may be simultaneously fished. Different colors of baits may be used to provide a more attractive presentation of fishing bait to the fish. While the fish may not be attracted to both of the colors at the same time. Following the construction of the frame of the fishing jig, the fishing jig is always fished with the plurality of hooks turned upwards so that the jig is virtually weedless and snag-proof.

While a preferred embodiment of the invention has been described using specific terms, such description is for illustrative purposes only, and it is to be understood that changes and variations may be made without departing from the spirit or scope of the following claims.

What is claimed is:

1. A deep underwater fishing jig comprising:
   a first upstanding fishhook carried generally in a first vertical plane;
   a second upstanding fishhook carried generally in a second vertical plane generally parallel to said first vertical plane;
   a first shank means connected to said first upstanding fishhook;
   a second shank means connected to said second upstanding fishhook;
   said first and second shank means disposed in a first horizontal plane;
   yoke means operatively connecting said first and second shank means;
   said yoke means including a first upwardly inclined yoke leg connected to a first convergent shank means and connected to a first convergent yoke leg;
   a second upwardly inclined yoke leg extending from a second convergent shank and connected to a second convergent yoke leg;
   said first and second convergent yoke legs converging generally to a point terminating in a raised eyelet, and
   said raised eyelet adapted for attachment to a fishing line and disposed in a second horizontal plane generally parallel to and vertically spaced from said first horizontal plane in a manner that said first and second fishhooks are turned upwards regardless of the angle at which said fishing jig enters the water and for maintaining said first and second fishhooks turned upwards while said fishing jig is pulled through the water to prevent snagging.

2. The device of claim 1 wherein said yoke means converges upwardly from said shank means to said raised eyelet and lies in a plane oriented at an acute angle with said first horizontal plane of said first and second shank means and said second horizontal plane of said raised eyelet means.

3. The device of claim 1 wherein said first shank means includes a first shank connected to said first fishhook terminating in a first convergent shank connected to said first convergent yoke leg, and said second shank means includes a second shank connected to said second fishhook terminating in a second convergent shank connected to said second convergent yoke leg.

4. The device of claim 3 including a weight carried by said first convergent shank and a second weight carried by said second convergent shank adjacent said yoke means.

* * * * *